US012109679B2

(12) United States Patent
Obitts

(10) Patent No.: US 12,109,679 B2

(45) Date of Patent: Oct. 8, 2024

(54) CREEPER WITH WIRE FRAME

(71) Applicant: Whiteside Mfg. Co., Delaware, OH (US)

(72) Inventor: Shane Obitts, Elyria, OH (US)

(73) Assignee: Whiteside Mfg. Co., Delaware, OH (US)

( * ) Notice: Subject to any disclaimer, the term of this patent is extended or adjusted under 35 U.S.C. 154(b) by 95 days.

(21) Appl. No.: 17/571,647

(22) Filed: Jan. 10, 2022

(65) Prior Publication Data

US 2023/0219211 A1 Jul. 13, 2023

(51) Int. Cl.
*B25H 5/00* (2006.01)

(52) U.S. Cl.
CPC .................................... *B25H 5/00* (2013.01)

(58) Field of Classification Search
CPC ........................................................ B25H 5/00
See application file for complete search history.

(56) References Cited

U.S. PATENT DOCUMENTS 1,098,262 A * 5/1914 Hollingshead ........... B25H 5/00 280/32.6
1,249,735 A * 12/1917 Foster ...................... B25H 5/00 280/32.6
1,764,756 A * 6/1930 Slee ........................ A47L 13/62 5/419
1,764,757 A * 6/1930 Slee ........................ A47L 13/62 5/419
3,104,116 A * 9/1963 Knight, Jr. ............. A61G 1/007 280/18
4,175,761 A * 11/1979 Marshall ................... B62B 1/12 280/DIG. 3
4,185,946 A * 1/1980 Mitchell ................... F04B 3/00 417/571
4,570,957 A * 2/1986 Rose ........................ B25H 5/00 280/32.6
4,754,885 A * 7/1988 Rich ....................... A47F 5/135 D34/21
4,792,147 A * 12/1988 Wissing ................... B25H 5/00 280/32.6
4,909,524 A * 3/1990 Paine ....................... B25H 5/00 280/18
5,397,139 A * 3/1995 Simpson .................. B25H 5/00 280/32.6
5,472,219 A * 12/1995 Eckstrum ................. B25H 5/00 280/32.6
5,484,150 A * 1/1996 Yasutomi .................. B62B 3/00 248/68.1
5,611,554 A * 3/1997 Eckloff ..................... B62B 3/00 280/79.2
5,934,639 A * 8/1999 Chiang .................. A47B 91/00 248/346.11
5,947,489 A * 9/1999 Tucker ..................... B25H 5/00 280/32.6

(Continued)

*Primary Examiner* — James M Dolak

(74) *Attorney, Agent, or Firm* — Renner, Kenner, Greive, Bobak, Taylor & Weber

(57) ABSTRACT

A creeper frame comprising: a first and second side-rail; and a plurality of cross-rails located between the first and second side-rail. The first and second side-rails each include two side-rail wires secured together by a plurality of side-rail wire clips, and each cross-rail of the plurality of cross-rails includes two cross-rail wires secured together by a cross-rail wire clip.

19 Claims, 6 Drawing Sheets

(56) References Cited

U.S. PATENT DOCUMENTS

| | | | | | |
|---|---|---|---|---|---|
| 6,095,532 | A * | 8/2000 | Martin | B25H 5/00 | 280/30 |
| 6,173,811 | B1 * | 1/2001 | Tornabene | E06C 1/387 | 182/20 |
| 6,199,877 | B1 * | 3/2001 | Shockley | B25H 5/00 | 280/32.6 |
| 6,604,747 | B2 * | 8/2003 | Moore | A62B 1/02 | 280/5.24 |
| 6,871,861 | B2 * | 3/2005 | Hernandez, Jr. | B25H 5/00 | 280/32.6 |
| 6,969,077 | B2 * | 11/2005 | Liu | B25H 5/00 | 280/30 |
| 7,188,843 | B2 * | 3/2007 | Magness | B62B 5/0003 | 280/30 |
| 7,374,181 | B1 * | 5/2008 | Wu | B25H 5/00 | 280/32.6 |
| 7,434,817 | B2 * | 10/2008 | Rush | B25H 5/00 | 280/32.6 |
| 7,481,438 | B2 * | 1/2009 | Hernandez | B25H 5/00 | 280/32.6 |
| 7,712,750 | B2 * | 5/2010 | Whiteside | B25H 5/00 | 280/32.6 |
| 8,002,289 | B2 * | 8/2011 | Diaz | B25H 5/00 | 280/32.6 |
| 9,061,413 | B2 * | 6/2015 | Huang | B25H 5/00 | |
| 9,126,326 | B1 * | 9/2015 | Bowen | B25H 5/00 | |
| 9,339,928 | B1 * | 5/2016 | Obitts | B25H 5/00 | |
| 9,623,551 | B1 * | 4/2017 | Bowen | B25H 5/00 | |
| 9,802,308 | B2 * | 10/2017 | Coutts | B60Q 3/78 | |
| 9,969,215 | B1 * | 5/2018 | Whiteside | B60B 33/0018 | |
| 10,232,504 | B1 * | 3/2019 | Whiteside | B25H 5/00 | |
| 10,524,576 | B2 * | 1/2020 | Huang | B25H 5/00 | |
| 10,524,968 | B2 * | 1/2020 | Allen | A61G 1/007 | |
| 10,843,329 | B1 * | 11/2020 | Sterns | B25H 5/00 | |
| 11,787,036 | B1 * | 10/2023 | Shrock | B25H 5/00 | 280/32.6 |
| 11,858,117 | B2 * | 1/2024 | Huang | B25H 5/00 | |
| 11,969,875 | B1 * | 4/2024 | Gess | B25H 5/00 | |
| 2004/0227313 | A1 * | 11/2004 | Shockley | B25H 5/00 | 280/32.6 |

* cited by examiner

CREEPER WITH WIRE FRAME

FIELD OF THE INVENTION

This invention relates to a creeper as used by mechanics when servicing vehicles. More particularly, this invention relates to a creeper which includes a frame made from wire or wire form which is sturdy and easy to maneuver.

BACKGROUND OF THE INVENTION

Mechanic's creepers include a frame which carry a pad, and which is supported by casters to render the creeper mobile. The frame most often includes side-rails which carry the casters and a plurality of cross-rails which extend between the side-rails, and which carry the pad.

Heretofore, most frames, both the side-rails and the cross-rails, have been of a round or square profile. Typically, these round or square profiles were constructed from round or square metal tubing. However, there are problems with both styles of frames. A frame made from round tubing makes it difficult to mount casters to the round configuration. A frame made from square tubing may not be as comfortable to the user as the round tube frame. Furthermore, frames made from either round or square tubing, at times, are not constructed to as sturdy as they could be. Therefore, there is a need in the art for a frame that makes it easy to mount casters, is comfortable to the user, and which provides more stability than a frame made from either round or square tubing.

SUMMARY OF THE INVENTION

It is thus an object of one aspect of the present invention to provide a creeper with a frame having the side-rails or the cross-rails made of at least two wires.

It is an object of another aspect of the invention to provide a creeper having a frame with both the side rails and the cross-rails made of at least two wires.

These and other objects of the present invention, as well as the advantages therefore over existing, prior art forms, which will become apparent from the description to follow, are accomplished by the improvements hereinafter described and clarified.

In general, in accordance with one aspect of the project invention, a creeper frame includes first and second side-rails each including at least two side-rail wires secured together by a plurality of side-rail clips. A plurality of cross-rails are located between the first and second side-rails, the cross-rails being secured to the side-rails.

In accordance with another aspect of the present invention a creeper-frame includes first and second side-rails. A plurality of cross-rails are located between the first and second side-rails. Each cross-rail has at least two cross-rail wires secured together by a cross-rail wire clip. The cross-rails are secured to the side-rails.

A creeper made in accordance with the present invention includes a frame, a plurality of casters secured to the frame, and a pad secured to the frame. The fame includes a first and second side-rails and a plurality of cross( )-rails secured between the side-rails. Each side-rail includes at least two wires secured together by a plurality of clips. Each cross-rail includes at least two wires secured together by at least one clip. The casters are secure to the side-rail clips and the pad is secured to the cross-rail clips.

A preferred exemplary creeper frame according to the concepts of the present invention is shown by way of example in the accompanying drawings without attempts to show all the various forms and modifications in which the invention might be embodied, the invention being measured by the appended claims and not by the details of the specification.

BRIEF DESCRIPTION OF THE DRAWINGS

For a complete understanding of the various aspects, structures, and operation of the invention, reference should be made to the following detailed description and accompanying drawings.

DETAILED DESCRIPTION OF ILLUSTRATIVE EMBODIMENTS

Figures 1, 2:
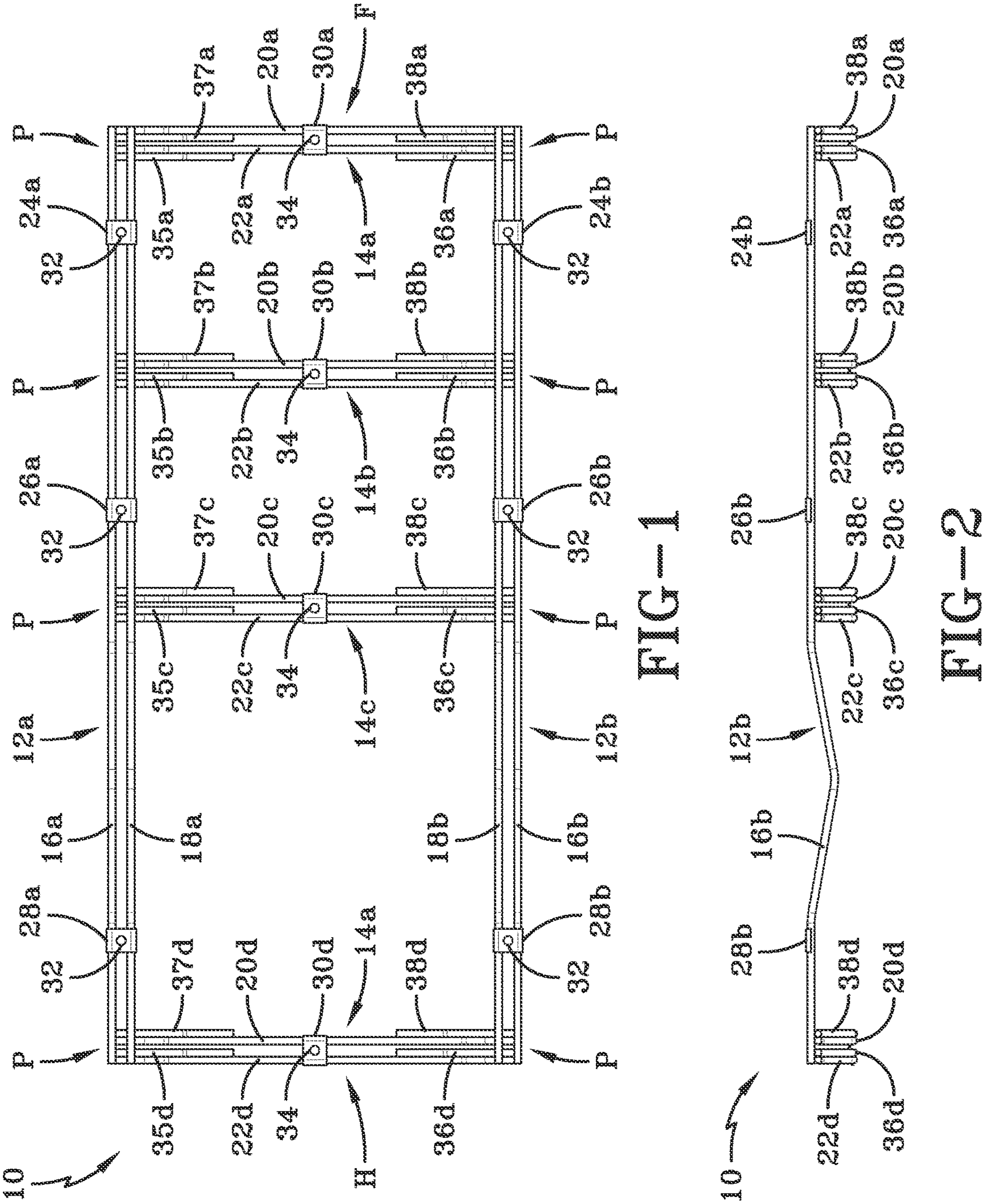
FIG. 1 is a top plan view of a creeper frame of the present invention.
FIG. 2 is a left side elevation view of the creeper frame of FIG. 1.

A representative embodiment of a creeper frame of the present invention is indicated in the drawings generally by the numeral 10. As shown in FIG. 1, creeper frame 10 generally includes two side-rails **12*a* and 12*b*, and four cross-rails 14*a*, 14*b*, 14*c*, and 14*d*. In one embodiment of the present invention, such as shown in FIG. 1, each side-rail 12 includes two side-rail wires 16 and 18. Specifically, side-rail 12*a* includes side-rail wires 16*a* and 18*a*, and side-rail 12*b* includes side-rail wires 16*b* and 18*b*. Similarly, each cross-rail 14 includes two cross-rail wires 20 and 22. Specifically, cross-rail 14*a* includes cross-rail wires 20*a* and 22*a*, cross-rail 14*b* includes cross-rail wires 20*b* and 22*b*, cross-rail 14*c* includes cross-rail wires 20*c* and 22*c*, and cross-rail 14*d* includes cross-rail wires 20*d* and 22*d***.

Figure 8:
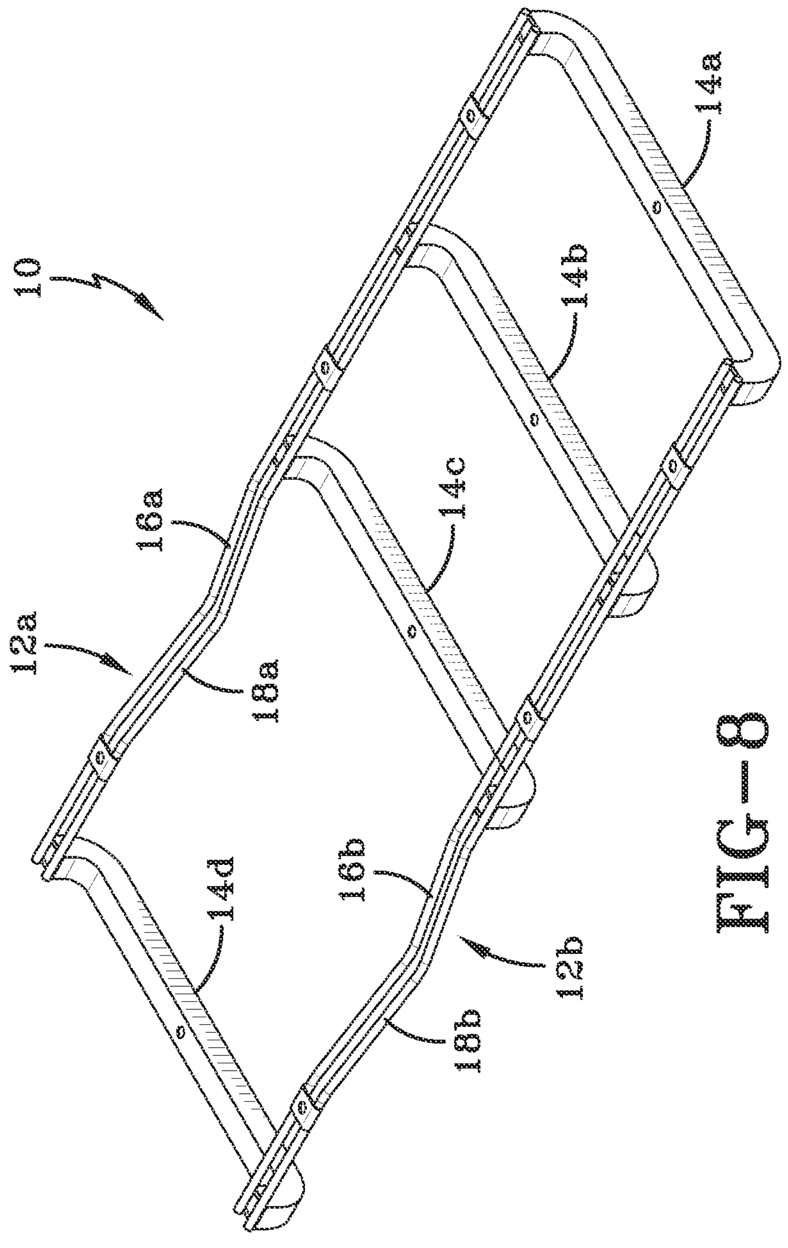
FIG. 8 is a top plan view of a creeper frame of the present invention.

In another embodiment of the present invention, creeper frame 10 could include side rails **12*a* and 12*b* made from two side-rail wires 16 and 18 and the cross-rails 14*a*, 14*b*, 14*c*, and 14*d* can be made from round or square metal tubing, such as shown in FIG. 8. Specifically, side-rail 12*a* includes side-rail wires 16*a* and 18*a*, and side-rail 12*b* includes side-rail wires 16*b* and 18*b***.

Figure 9:
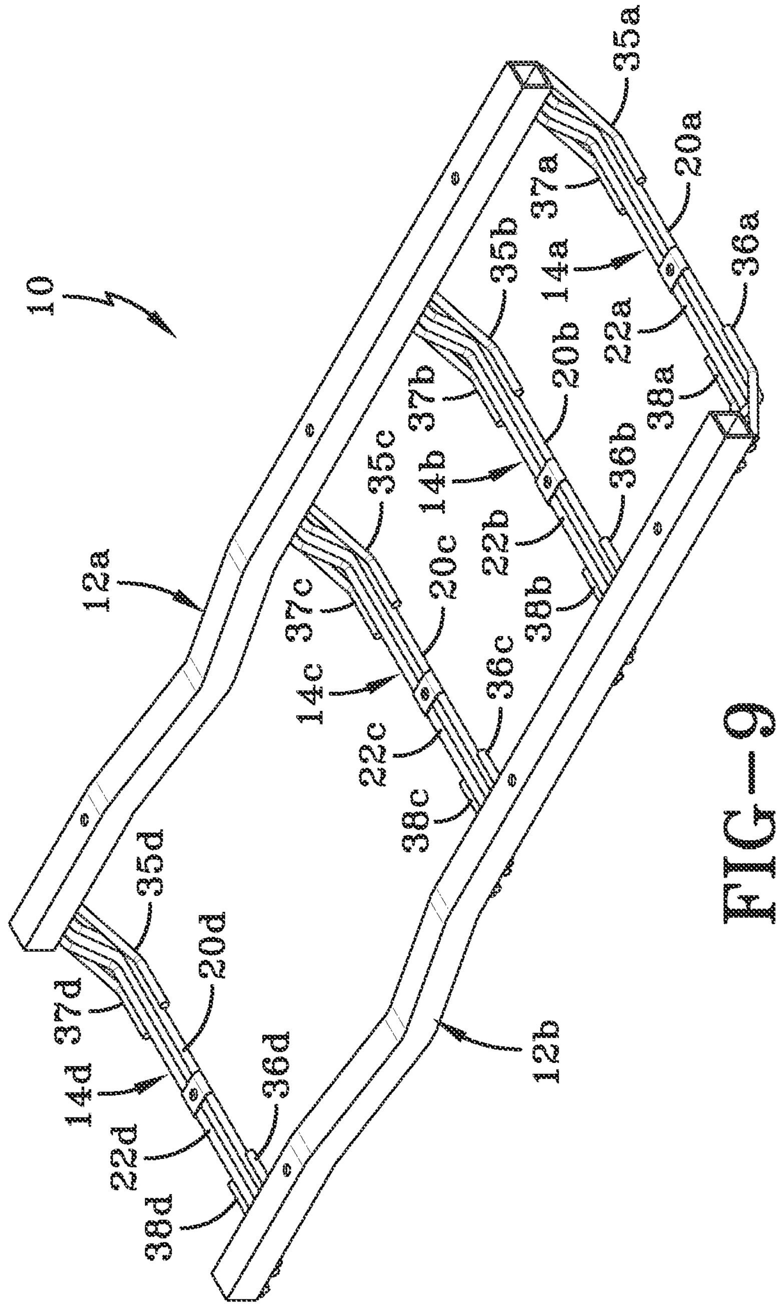
FIG. 9 is a top plan view of a creeper frame of the present invention.

In another embodiment of the present invention, creeper frame 10 could include cross-rails **14*a*, 14*b*, 14*c*, and 14*d* each including two cross-rail wires 20 and 22 and the side rails 12*a* and 12*b* can be made from round or square metal tubing, such as shown in FIG. 9. Specifically, cross-rail 14*a* includes cross-rail wires 20*a* and 22*a*, cross-rail 14*b* includes cross-rail wires 20*b* and 22*b*, cross-rail 14*c* includes cross-rail wires 20*c* and 22*c*, and cross-rail 14*d* includes cross-rail wires 20*d* and 22*d***.

As can also be seen in FIG. 1, the side-rail wires 16 and 18 are secured together by a plurality of side-rail wire clips 24, 26, and 28. Specifically, side-rail wires 16*a* and 18*a* are secured together by side-rail wire clips 24*a*, 26*a*, and 28*a* and side-rail wires 16*b* and 18*b* are secured together by side-rail wire clips 24*b*, 26*b*, and 28*b*. Each side rail clip 24, 26, and 28 is secured to their respective side-rail wires 16 and 18 by resistance welding or any other suitable connection. Similarly, cross-rail wires 20 and 22 are secured together by a cross-rail wire clip 30. Specifically, cross-rail wires 20*a* and 22*a* are secured together by cross-rail clip 30*a*, cross-rail wires 20*b* and 22*b* are secured together by cross-rail clip 30*b*, cross-rail wires 20*c* and 22*c* are secured together by cross-rail clip 30*c*, and cross-rail wires 20*d* and 22*d* are secured together by cross-rail clip 30*d*. Each cross-rail clip 30 is secured to their respective cross-rail wires 20 and 22 by resistance welding, or an equivalent connection method.

Figure 7:
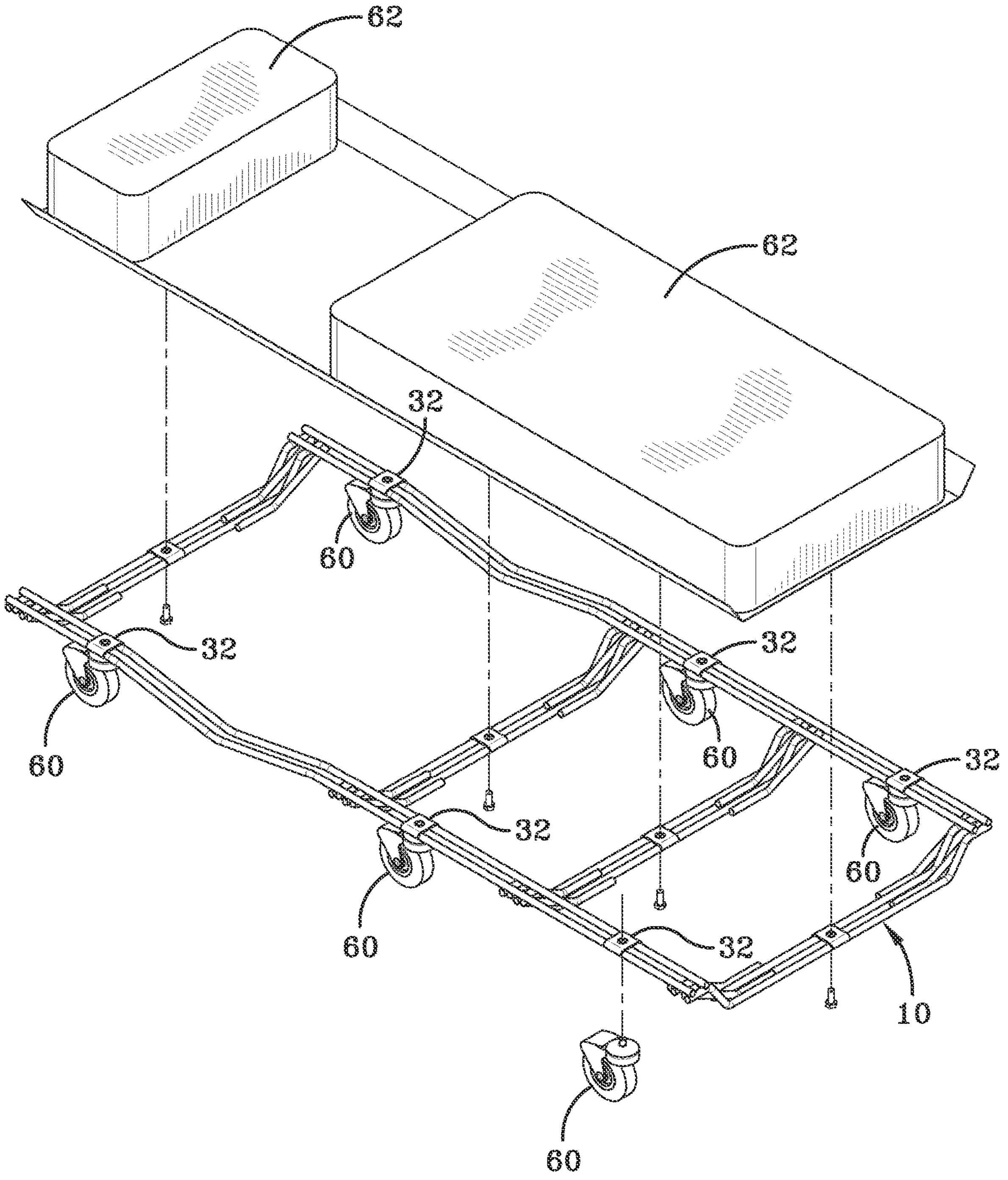
FIG. 7 is a left side elevation view of a creeper utilizing the creeper frame of the present invention.

Side-rail wire clips 24, 26, and 28 each include an aperture 32. As shown in FIG. 7, each aperture 32 is used to attach a caster 60 to the frame 10. The caster stem of each respective caster can protrude through the aperture 32 and will be secured in place with a washer and nut. Similarly, the cross-rail clips 30*a*, 30*b*, 30*c*, 30*d* (see FIG. 1) each include an aperture 34, which are used to mount a back pad 62 to the frame 10. The back pad can contain bolt portions that will protrude through each aperture 34 and the bolt portions can be secured in place with a washer and nut.

To strengthen the connection points P between the side-rails 12 and the cross-rails 14, each cross-rail 14*a*, 14*b*, 14*c*, and 14*d* includes four cross-rail wire gussets 35, 36, 37 and 38 that are located adjacent each cross-rail wire 20 and 22 (as will hereinafter be discussed in more detail) near the connection points P. Specifically, cross-rail 14*a* includes cross-rail wire gussets 35*a*, 36*a*, 37*a*, and 38*a* located adjacent to cross-rail wires 20*a* and 22*a*, cross-rail 14*b* includes cross-rail wire gussets 35*b*, 36*b*, 37*b*, and 38*b* located adjacent to cross-rail wires 20*b* and 22*b*, cross-rail 14*c* includes cross-rail wire gussets 35*c*, 36*c*, 37*c*, and 38*c* located adjacent to cross-rail wires 20*c* and 22*c*, and cross-rail 14*d* includes cross-rail wire gussets 35*d*, 36*d*, 37*d*, and 38*d* located adjacent to cross-rail wires 20*d* and 22*d*.

The positioning of the cross-rail wire gussets 35, 36, 37, and 38 near the connection points P between the side-rails 12 and the cross-rails 14 provides additional strength to the connection of side-rails 12 and cross-rails 14 at each connection point P. Each connection point P can include four resistance weld positions, each taking place where each side-rail wire 16 and 18 cross over each cross-rail wire 20 and 22.

The cross-rail wire gussets 35, 36, 37, and 38 are positioned such that cross-rails 14*a*, 14*b*, 14*c*, and 14*d* each have cross-rail wire gussets 35 and 36 located between each of the cross-rail wires 20 and 22, the cross-rails 14*b*, 14*c*, and 14*d* each have cross-rail wire gussets 37 and 38 located adjacent cross-rail wire 20 in a position such that cross-rail wire gussets 37 and 38 are located closer to the foot F and distal to the head H of the frame 10 as compared to the position of cross-rail wire gussets 35 and 36, and cross-rail 14*a* has cross-rail wire gussets 37 and 38 located closer to the head H and distal to the foot F of the frame 10 as compared to the position of cross-rail wire gussets 35 and 36, as shown in FIG. 1.

In another embodiment of the present invention, the cross-rail gussets 35, 36, 37, and 38 are positioned such that cross-rails 14*a*, 14*b*, 14*c*, and 14*d* each have cross-rail wire gussets 35 and 36 located on an exterior portion of cross-rail wire 20, and the cross-rail wire gussets 37 and 38 are located on an exterior portion of cross-rail wire 22, such as shown in FIG. 9.

It should therefore be seen that the position of the cross-rail gussets can include any combination of the cross-rail gussets 35 and 36 being positioned on an exterior portion of a cross-rail wire 20 or 22 or located between the cross-rail wires 20 and 22. Similarly, the cross-rail gussets 37 and 38 can be positioned on an exterior portion of a cross-rail 20 and 22. Furthermore, the positions of the cross-rail gussets 35, 36, 37, and 38 can vary from each cross-rails 14*a*, 14*b*, 14*c*, and 14*d* within frame 10 of the present invention.

Figure 3:
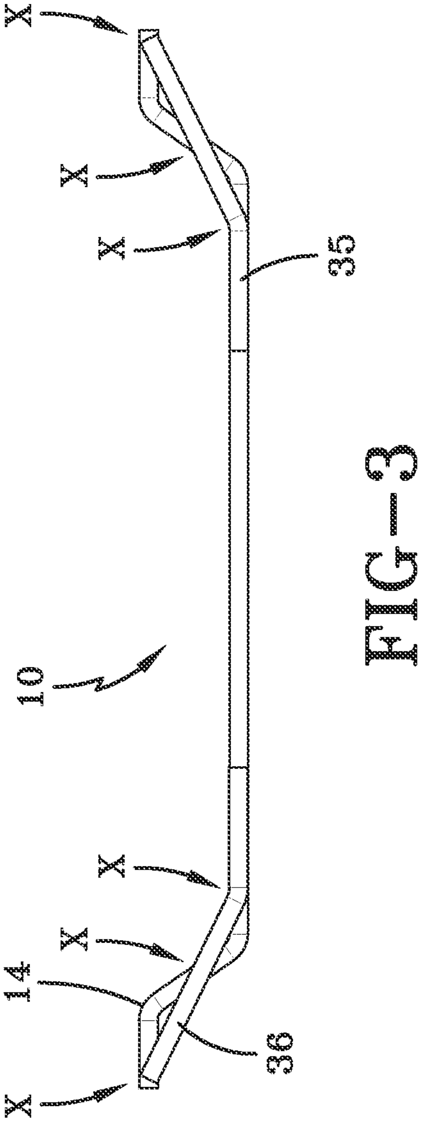
FIG. 3 is a front elevated view of a cross-rail wire gusset secured to a cross-rail according to embodiment of the present invention.

FIG. 3 shows how cross-rail wire gussets 35 and 36 are secured to a cross-rail 14 to strengthen frame 10. Cross-rail wire gussets 35 and 36 are shown in FIG. 3 as being resistance welded to cross-rail 14 at three positions X adjacent each end of the cross-rail wire gussets 35 and 36 and the cross-rail 14. As also shown in FIG. 3, an end of the cross-rail wire gusset 35 and an end of the cross-rail wire gusset 36 will each be flush with an end of cross-rail 14 such that there will be no sharp edges which could injure a user of frame 10.

Figure 4:
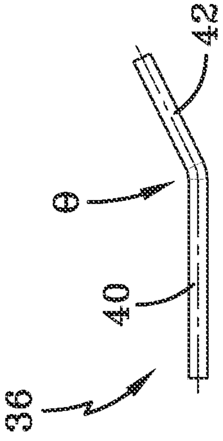
FIG. 4 is an elevated view of a cross-rail wire gusset according to another embodiment of the present invention.

FIG. 4 shows a typical cross-rail wire gusset of the present invention. A cross-rail wire gusset 36 is a continuous piece of wire, which is bent at an angle θ to create a longer portion 40 and a shorter portion 42. In one or more embodiments, angle θ is a 25° angle, and the longer portion 40 has a length of over 3 inches, and in at least one embodiment, of at least 3.3 inches, while the shorter portion 42 has a length of at least 2 inches, and in at least one embodiment, of at least 2.5 inches.

Figure 5:
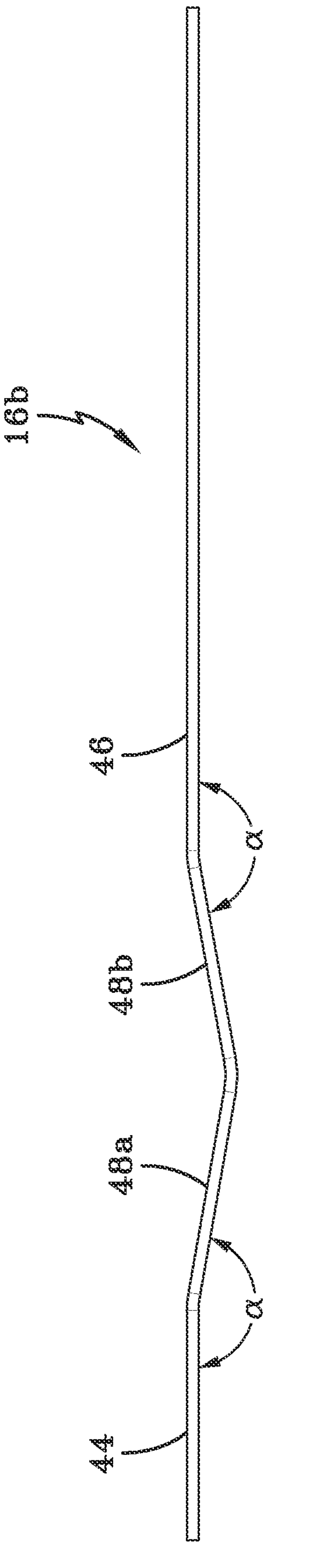
FIG. 5 is a left side elevated view of a side-rail wire of the present invention.

FIG. 5 is a side-view of a side-rail wire, such as wire 16*b*, of the present invention. Side-rail wire 16*b* includes a short straight portion 44, a long straight portion 46, and two angled portions 48*a* and 48*b* which form a dipped portion D. In practice, dipped portion D is where the shoulders blades of the user will lie while utilizing a creeper having creeper frame 10. In one or more embodiments, the short straight portion 44 and the two angled portions 48*a* and 48*b* have a length of about 6 inches each and the long straight portion 46 has a length of about 22 inches such that the total length of the side-rail wire 16 is about 40 inches. The bend between the short straight portion 44 and angled portion 48*a* is bent at an angle α which is the same angle of the bend between the long straight portion 46 and the angled portions 48*b*. In one or more embodiments, angle α is more than 155° and less than 178.

Figure 6:
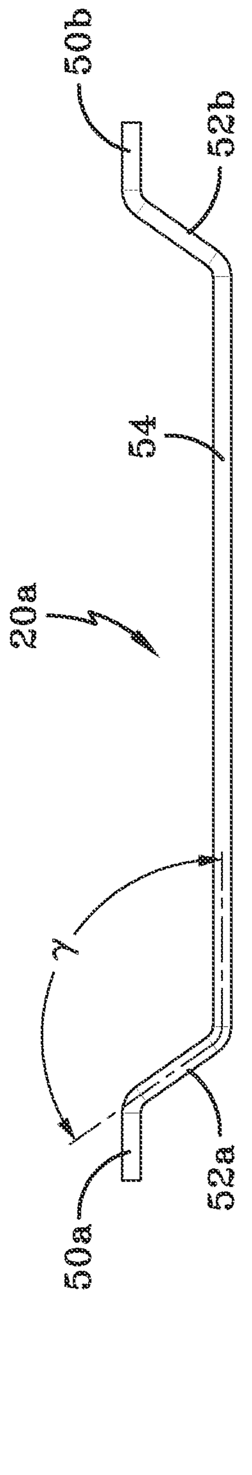
FIG. 6 is a front elevated view of a cross-rail wire of the present invention.

FIG. 6 is a front plan view of a cross-rail wire, such as wire 20*a*, of the present invention. A cross-rail wire 20*a* includes two short straight portions 50*a* and 50*b*, two angled portions 52*a* and 52*b*, and one long straight portion 54. In one or more embodiments, the short straight portions 50*a* and 50*b* have a length of between about 1.1 and about 1.2 inches, the angled portions 52*a* and 52*b* have a length of between about 1.4 and about 1.5 inches, and the long straight portion 54 has a length of between about 12.4 and about 12.6 inches such that the total length of the cross-rail wire 20*a* is between about 17.4 and 18.0 inches. The angle β of the bend between the short portion 50*a* and the angled portion 52*a* is about 55°, which is the same angle of the bend between the short straight portion 50*b* and the angled portion 52*b*. Alternatively, the cross-rail wire 20*a* defines an opposite angle γ between the short portion 50*a* and the angled portion 52*a* of about 125°, which is the same as the opposite angle between the angled portion 52*a* and the long straight portion 54. The angles of both angle β and γ allow for the short portion 50$a$ and the long straight portion 54 of cross-rail wire 20$a$ to be parallel, which is also parallel with the ground (55°+125°=180°).

In one or more embodiments of the present invention, the diameter of each side-rail wire 16 and 18 is at most about 0.5 inches, and at least about 0.3 inches. In one or more embodiments of the present invention, a 0.307-inch diameter side-rail wire is used.

In one or more embodiments of the present invention, the diameter of each cross-rail wire 20 and 22 is at most about 0.5 inches, and at least about 0.3 inches. In one or more embodiments of the present invention, a 0.307-inch diameter cross-rail wire is used.

In one or more embodiments of the present invention, the diameter of each cross-rail wire gusset 35, 36, 37, and 38 is at most about 0.5 inches and at least 0.3 inches. In one or more embodiments, a 0.307-inch diameter cross-rail wire gusset is used.

In one or more embodiments of the present invention, the side-rail wires 16 and 18, the cross-rail wires 20 and 22, and the wire gussets 35, 36, 37 and 38 are made from a material selected from the group consisting of grade 1008 carbon steel, grade 1010 carbon steel, and grade 1018 carbon steel.

In light of the foregoing, it should be appreciated that the present invention significantly advances the art by providing a wire creeper frame and creeper utilizing said frame that is structurally and functionally improved in a number of ways.

What is claimed is:

1. A creeper frame comprising first and second side-rails, each of said first and second side-rails including two side-rail wires which are spaced apart horizontally, said two side-rail wires being secured together by a plurality of side-rail wire clips;

a plurality of cross-rails located between the first and second side-rails; said plurality of cross-rails being secured to said first and second side-rails; and each side-rail wire clip of said plurality of side-rail wire clips including a circular, fully enclosed aperture to receive a caster stem of a respective caster securable to the creeper frame.

2. The creeper frame of claim 1, wherein each cross-rail of said plurality of cross-rails includes at least two cross-rail wires secured together by a plurality of cross-rail clips.

3. The creeper frame of claim 1, wherein each cross-rail of said plurality of cross-rails is made from metal tubing.

4. The creeper frame of claim 1, wherein said plurality of cross-rails includes four cross-rails.

5. The creeper frame of claim 4, wherein each cross-rail of the four cross-rails includes a first end secured to said first side-rail through resistance welding and a second end secured to said second side-rail through resistance welding.

6. The creeper frame of claim 5, wherein two cross-rail wire gussets are located adjacent said first end of each said cross-rail of the four cross-rails and wherein two cross-rail wire gussets are located adjacent said second end of each said cross-rail of the four cross-rails where said cross-rail wire gussets are pieces of wire bent at an angle such that the pieces of wire include a longer portion and a shorter portion.

7. The creeper frame of claim 1, wherein said creeper frame includes three side-rail wire clips to secure together through resistance welding the two-side rail wires of the first side-rail and wherein said creeper frame further includes three side-rail wire clips to secure together through resistance welding the two side-rail wires of the second side-rail.

8. The creeper frame of claim 2, wherein each cross-rail clip of said plurality of cross-rail clips includes a circular, fully enclosed aperture to receive a respective bolt portion of a back pad securable to the creeper frame.

9. The creeper frame of claim 6, wherein each side-rail wire, each cross-rail, and each wire gusset are made from a material selected from the group consisting of grade 1008 carbon steel, grade 1010 carbon steel, and grade 1018 carbon steel, and wherein each side-rail wire, each cross-rail, and each wire gusset has a diameter of between 0.5 and 0.3 inches.

10. The creeper frame of claim 1, further comprising a plurality of cross-rail wire gussets to provide additional strength to the connection between the cross-rails and the side rails, where said cross-rail wire gussets are pieces of wire bent at an angle.

11. A creeper frame comprising first and second side-rails, a plurality of cross-rails located between the first and second side rails, each cross-rail of said plurality of cross-rails having at least two cross-rail wires which are spaced apart horizontally, said at least two cross-rail wires being secured together by a cross-rail wire clip, said plurality of cross-rails being secured to said first and second side-rails, and each of said at least two cross-rail wires including a first short straight portion extending to a first angled portion extending to a long straight portion extending to a second angled portion extending to a second short straight portion.

12. The creeper frame of claim 11, wherein each of said first and second side-rails includes at least two side-rail wires secured together by a plurality of side-rail clips, each side-rail wire including a short straight portion extending to a first angled portion extending to a second angled portion extending to a long straight portion, where a first bend between the short straight portion and the first angled portion is at a first angle, where a second bend between the long straight portion and the second angled portion is at a second angle, where the first angle and the second angle are the same.

13. The creeper frame of claim 11, wherein said plurality of cross-rails includes four cross-rails.

14. The creeper frame of claim 13, wherein each cross-rail of the four cross-rails includes a first end secured to said first side-rail through resistance welding and a second end secured to said second side-rail through resistance welding.

15. The creeper frame of claim 14, wherein two cross-rail wire gussets are located adjacent said first end of each said cross-rail of the four cross-rails and wherein two cross-rail wire gussets are located adjacent said second end of each said cross-rail of the four cross-rails, where said cross-rail wire gussets are pieces of wire bent at an angle such that the pieces of wire include a longer portion and a shorter portion.

16. The creeper frame of claim 11, wherein said creeper frame includes three side-rail wire clips to secure together through resistance welding the two-side rail wires of the first side-rail and wherein said creeper frame further includes three side-rail wire clips to secure together through resistance welding the two side-rail wires of the second side-rail.

17. The creeper frame of claim 11, wherein each of said first and second side-rails is made from metal tubing.

18. A creeper comprising a creeper frame including first and second side-rails;

a plurality of casters, each of the plurality of casters being secured to one of the first and second side-rails of the creeper frame;

a pad secured to the creeper frame;

a plurality of cross-rails secured between the first and second side-rails; and a plurality of cross-rail wire gussets located adjacent each end of each cross-rail, where said cross-rail wire gussets are pieces of wire bent at an angle;

wherein said first and second side-rails include at least two side-rail wires which are spaced apart horizontally and secured stationarily by a plurality of side-rail wire clips, wherein each cross-rail of said plurality of cross-rails includes at least two cross-rail wires which are spaced apart horizontally and secured stationarily by at least one cross-rail wire clip, where respective casters of said plurality of casters are secured to respective side-rail wire clips of the plurality of side-rail wire clips, and wherein said pad is secured to the cross-rail wire clips.

19. The creeper of claim 18, where said cross-rail wire gussets include a longer portion and a shorter portion, and where each distal end of each cross-rail wire gusset is flush with a respective distal end of said cross-rail wires.

* * * * *